United States Patent
Dong et al.

(10) Patent No.: US 6,423,004 B1
(45) Date of Patent: Jul. 23, 2002

(54) REAL-TIME ULTRASOUND SPATIAL COMPOUNDING USING MULTIPLE ANGLES OF VIEW

(75) Inventors: Fang Dong, Waukesha; Steven Charles Miller, Pewaukee; Larry Y. L. Mo, Waukesha, all of WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 33 days.

(21) Appl. No.: 09/580,944

(22) Filed: May 30, 2000

(51) Int. Cl.[7] ................................................. A61B 8/00
(52) U.S. Cl. ...................................................... 600/443
(58) Field of Search ................................. 382/128, 131, 382/205, 284; 600/437, 443, 447; 128/916

(56) References Cited

U.S. PATENT DOCUMENTS

| | | | |
|---|---|---|---|
| 5,575,286 A | * 11/1996 | Weng et al. | 600/444 |
| 5,653,235 A | 8/1997 | Teo | |
| 5,782,766 A | 7/1998 | Weng | |
| 6,126,598 A | * 10/2000 | Entrekin et al. | 600/437 |

\* cited by examiner

*Primary Examiner*—Francis J. Jaworski
(74) *Attorney, Agent, or Firm*—McAndrews, Held & Malloy, Ltd.; Peter J. Vogel; Michael A. Dellapenna

(57) ABSTRACT

A method and an apparatus for spatially compounding ultrasound frames by using multiple angle views. Successive image frames of pixel data are processed using a Sum of Absolute Difference registration algorithm. The multiple angle views are achieved by operator manipulation of a probe (2).

14 Claims, 4 Drawing Sheets

REAL-TIME ULTRASOUND SPATIAL COMPOUNDING USING MULTIPLE ANGLES OF VIEW

BACKGROUND OF THE INVENTION

This invention generally relates to techniques for spatial compounding of ultrasound image frames and more specifically for using multiple view angles to achieve such spatial compounding.

Conventional ultrasound imaging systems comprise an array of ultrasonic transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. In the case of a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. A scan line's resolution is a result of the directivity of the associated transmit and receive beam pair.

A B-mode ultrasound image is composed of multiple image scan lines. The brightness of a pixel is based on the intensity of the echo return from the biological tissue being scanned. The outputs of the receive beamformer channels are coherently summed to form a respective pixel intensity value for each sample volume in the object region or volume of interest. These pixel intensity values are log-compressed and scan-converted to form an image frame of pixel data which can be displayed on a monitor.

Multiple scans are performed in succession and multiple image frames are displayed at the acoustic frame rate on the display monitor. In the case where the sonographer is manipulating the transducer probe by hand, any change in the angle (i.e., wobble) of the probe during scanning will cause corresponding changes in the angle at which the transmit beam impinges on the biological tissue being imaged. The result is that some tissue will appear bright during one scan at one angle and dark during another scan at another angle. To compensate for this angle-dependent fluctuation in the intensity of the echo signals reflected by the tissue, it is well known to combine the bright regions from successive image frames to form a compound image. This process is known as spatial compounding. One aspect of successful spatial compounding of the ultrasound images from different angles is to accurately register the ultrasound image frames. Errors in image registration during compounding can cause blurring and possibly loss of the details in the original images. Spatial compounding of image frames from different view angles helps reduce the speckle noises, thus increasing the capability of tissue differentiation, and also improves the visualization of the boundaries and internal lesions posterior to the boundaries.

U.S. Pat. No. 5,653,235 (Teo, issued Aug. 5, 1997) describes a method of performing spatial compounding of image frames by a two-dimensional array transducer. In that patent, an ultrasound beam is electronically steered to focus on the same region, but from two different directions. The received image frames are combined to form a compounded image. This approach generally lacks flexibility and the number of view directions is limited.

Several methods have been used successfully in ultrasound image registration, including the Sum of Absolute Differences (SAD) technique, the correlation technique and the landmark matching technique.

There is a need for an ultrasound spatial compounding technique in which viewing direction is conveniently determined by an operator and the number of view directions is not limited.

BRIEF SUMMARY OF THE INVENTION

The preferred embodiment is useful for spatial compounding of ultrasound image frames from different view angles. In such an environment, the preferred embodiment comprises transmitting first ultrasound waves toward a subject from a first angle and receiving first reflected ultrasound waves from the subject in response to the first transmitted ultrasound waves. Second ultrasound waves also are transmitted toward a subject from a second angle, and second reflected ultrasound waves are received from the subject in response to the second transmitted ultrasound waves. The transmitting and receiving preferably are accomplished with an ultrasound transducer array or probe. A first frame of data representing a first image is generated in response to the first reflected ultrasound waves, and a second frame of data representing a second image is generated in response to the second reflected ultrasound waves. The generating preferably is accomplished with a processor. At least the first frame and second frame are stored and an image registration algorithm also is stored. The storing preferably is done in a memory. The algorithm is executed to register the first frame with the second frame and to generate a third frame of data representing a registered image. The execution of the algorithm preferably is done with the processor. The third frame of data is displayed, preferably on a display monitor.

By using the foregoing techniques, the viewing direction of the ultrasound waves is flexible and at the discretion of an operator. Moreover, the number of view directions is unlimited. In addition, these techniques are not limited by the type of transducer used.

DETAILED DESCRIPTION OF THE INVENTION

Figure 1:
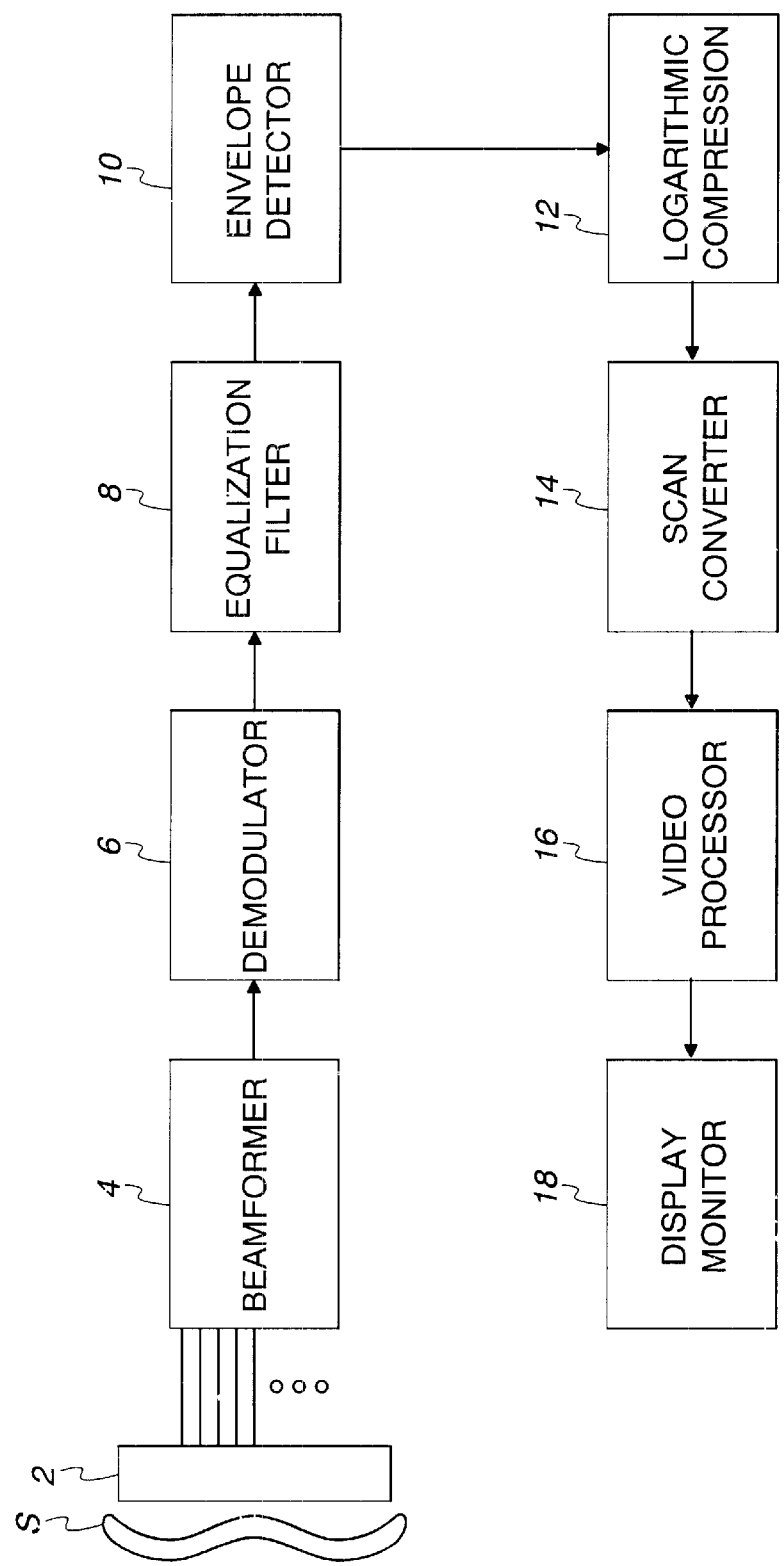
FIG. 1 is a schematic block diagram showing the B-mode signal processing chain for one type of ultrasound imaging system in which the present invention can be incorporated.

One type of ultrasound imaging system in which the present invention can be incorporated is shown in FIG. 1. The system comprises a transducer array or probe 2 consisting of a plurality of separately driven transducer elements, each of which produces a burst of ultrasonic energy (e.g., B1–B8 shown in FIG. 3) when energized by a pulsed waveform produced by a transmitter incorporated in transmit and receive beamformers 4. Bursts B1–B8 collectively form a beam BM (FIG. 3) of ultrasound energy transmitted into a subject under study S (FIG. 1). The ultrasonic energy reflected back to transducer array 2 from the subject under study S is converted to an electrical signal by each receiving transducer element and applied separately to a receiver incorporated in beamformers 4 through a set of transmit/receive (T/R) switches (not shown). The transmit and receive beamformers 4 are operated under control of a host computer.

A complete scan is performed by acquiring a series of echoes in which the transmitter is gated on momentarily to energize each transducer element in the transmit aperture, and the subsequent echo signals produced by each transducer element are applied to the receiver. The receiver combines the separate echo signals from each transducer element to produce a single echo signal which is used to produce a line in an image on a display monitor 18.

Figure 2:
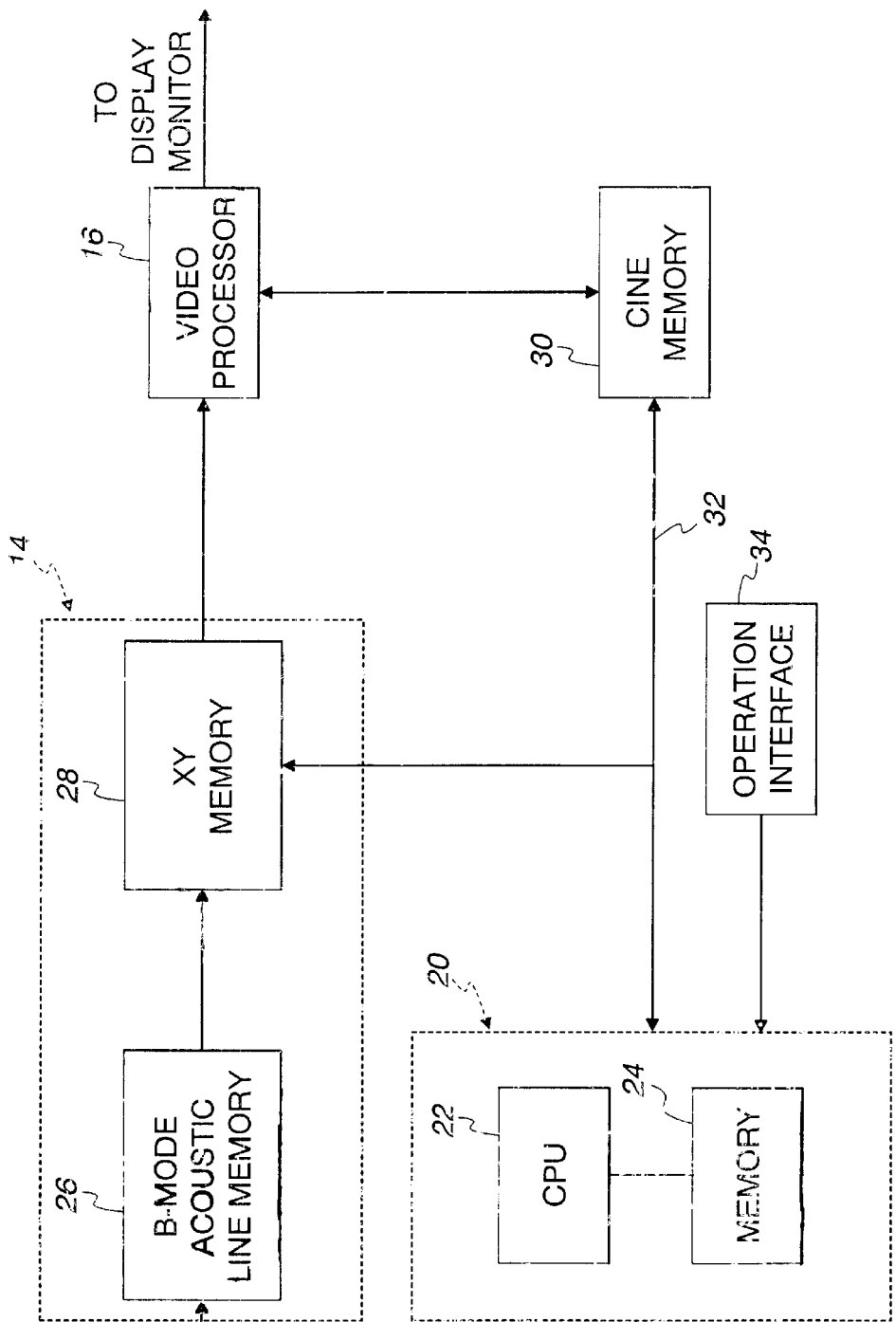
FIG. 2 is a schematic block diagram showing the back end of the ultrasound imaging system shown in FIG. 1, with the addition of a host computer programmed to perform image registration in accordance with one preferred embodiment of the invention.
Figure 3:
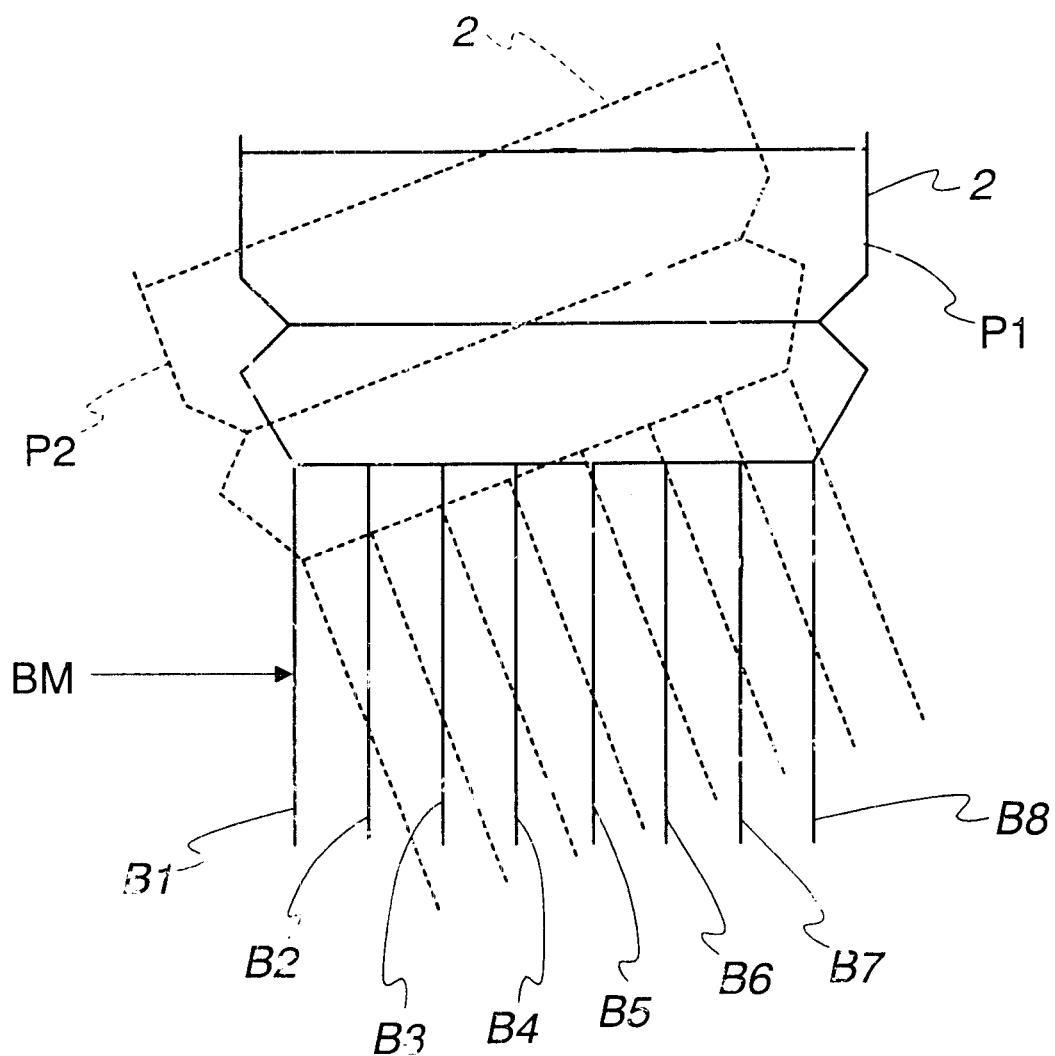
FIG. 3 is a schematic block diagram showing a preferred technique for orienting the probe shown in FIG. 1.

The technique described in this disclosure is substantially different from the prior art. In the current technique, an image frame is formed by simply wobbling probe 2 in-plane, and the successive image frames from different angles (caused by in-plane wobbling) are compounded in real-time by a fast image registration method. Our preferred approach is to achieve the spatial compounding by wobbling probe 2 manually at different directions without beam steering. As shown in FIG. 3, the image frames from the different angles (generated by wobbling the probe in-plane) are subsequently registered and compounded in a frame buffer, and the compounded image is displayed in real-time. For example, one frame is acquired while probe 2 is in position P1 (FIG. 3), and another frame is acquired while probe 2 is in position P2. The frames are stored in memory 24 (FIG. 2). The advantage of this approach is that the viewing direction is flexible and up to the operator, and the number of view directions is unlimited. More importantly, the method doesn't depend on the type of probe used, i.e., the method is not limited to 2D-array transducer as required in the prior art. However, this approach is dependent upon the accuracy of the image registration, and it also requires a fast host processor, because the implementation is done by software instead of hardware. However, the implementation could be achieved by hardware alone, or a combination of hardware and software.

The receiver's signal inputs in beamformers 4 are low-level analog RF signals from the transducer elements. The receiver is responsible for analog-to-digital conversion and for receive beam forming. In baseband imaging systems, the beamsummed signal is output to a demodulator 6 which converts the beamsummed signal into baseband in-phase I and quadrature Q receive beams. The I and Q acoustic data vectors from the demodulator 6 are output to an FIR filter 8 which is programmed with filter coefficients from a filter coefficient memory (not shown). The filter coefficient memory is programmed by the host computer. The demodulator 6 and FIR filter 8 are programmed to convert a band of frequencies centered at the fundamental frequency fv of the transmit waveform (or a (sub)harmonic frequency thereof) to baseband I/Q data.

Vectors of I and Q acoustic data are optionally subject to a TGC/LGC block (not shown), which provides time gain and/or lateral gain compensation. Time gain compensation fine tunes the image in the axial direction by increasing or decreasing gain as a function of depth (time) for all received vectors. Lateral gain compensation fine tunes the image in the lateral direction by increasing or decreasing gain as a function of lateral position (beam or vector position). In the former case, gain is controlled in small rows of the image. In the latter case, gain is controlled in small sectors of the image.

After filtering, the acoustic data is sent to a B-mode processor, which converts the I and Q acoustic data into a log-compressed version of the signal envelope. The B-mode processor comprises an envelope detector 10 for forming the envelope of the beamsummed receive signal. The envelope of a baseband signal is the magnitude of the vector which I and Q represent. The I, Q phase angle is not used in the B-mode display. The magnitude (i.e., intensity) of the signal is the square root of the sum of the squares of the orthogonal components, i.e., $(I^2+Q^2)^{1/2}$. The envelope of the signal undergoes some additional B-mode processing, such as logarithmic compression (block 12 in FIG. 1).

The B-mode intensity data is output to a scan converter 14, which converts that data into an X-Y format. The scan-converted frames are passed to a video processor 16, which maps the video data to a gray-scale mapping for video display. The gray-scale image frames are then sent to the video monitor 18 for display. The images displayed by the video monitor 18 are produced from an image frame of data in which each datum indicates the intensity or brightness of a respective pixel in the display. An image frame may, e.g., comprise a 256×256 data array in which each intensity datum is a multi-bit binary number that indicates pixel brightness. The brightness of each pixel on the display monitor 18 is continuously refreshed by reading the value of its corresponding element in the data array in a well-known manner. Each pixel has an intensity value which is a function of the backscatter cross section of a respective sample volume in response to interrogating ultrasonic pulses and the gray map employed. The displayed image represents the tissue and/or blood flow in a plane through the body imaged.

In another conventional system, the RF signals are summed, equalized and envelope detected without intervening demodulation to baseband. To depict such a system, it is only necessary to remove block 6 from FIG. 1 and connect the output of the beamformer 4 to the input of the equalization filter 8. It should be appreciated that the invention can be employed in both RF and baseband systems.

Referring to FIG. 2, system control is centered in a host computer 20, which accepts operator inputs through an operator interface 34 (e.g., a control panel) and in turn controls the various subsystems.

The host computer 26 performs system level control functions. A scan controller (not shown) provides real-time (acoustic vector rate) control inputs to the various subsystems. The scan controller is programmed by the host computer with the vector sequences and synchronization options for acoustic frame acquisitions. Thus, the scan controller controls the density of beam BM (FIG. 3). The beam distribution is controlled by manipulation of the operator (e.g., into positions P1 and P2). The scan controller transmits the beam parameters defined by the host computer to the subsystems via a scan control bus (not shown).

The scan converter 14 comprises an acoustic line memory 26 for scan converting B-mode data and an X-Y display memory 28 for storing each frame of scan-converted data in a respective one of a bank of frame memories. The acoustic line memory accepts the processed vectors of B-mode intensity data and interpolates where necessary, and also performs the coordinate transformation of the B-mode intensity data from polar coordinate (R-θ) sector format or Cartesian coordinate linear format to appropriately scaled Cartesian coordinate display pixel intensity data, which is stored in the X-Y display memory.

Each image frame from the X-Y memory 28 is passed to the video processor 16, which converts the pixel intensity data to the video frame rate and then maps the pixel intensity data to a gray-scale mapping for video display. A conventional ultrasound imaging system typically employs a variety of gray maps, which are simple transfer functions of the raw intensity data to display gray-scale levels. The gray-scale image frames are then sent to the display monitor 18 for display.

Successive frames of display pixel intensity data (i.e., data not yet gray-mapped by the video processor) are stored in a cine memory 30 on a first-in, first-out basis. Storage can be continuous or as a result of an external trigger event. The cine memory 30 is like a circular image buffer that runs in the background, capturing image data that is displayed in real time to the user. When the user freezes the system (by operation of an appropriate device on the operator interface 34), the user has the capability to view image data previously captured in cine memory.

The host computer 20 comprises a central processing unit (CPU) 22 and a random access memory 24. The CPU 22 is programmed to control the time delays applied by the transmit and receive beamformers, the filtering applied by the filter, and the mapping applied by the video processor. The host computer also controls the flow of data between the X-Y display memory 28, the video processor 16, the cine memory 30 and the host computer 20 itself. In particular, the flow of data to and from the host computer 20 is indicated by the system data bus 32 in FIG. 2. Each frame of pixel data, representing one of a multiplicity of scans or slices through the object being examined, can be retrieved by the host computer from the X-Y display memory 28 or from the cine memory 30, which stores a stack of frames. In accordance with one preferred embodiment of the invention, the CPU 22 retrieves two successive image frames (from either X-Y display memory 28 or cine memory 30) and then preferably performs a robust Sum of Absolute Difference (SAD) image registration. The SAD computes the summation of the absolute difference of the pixel values in the two images. The offset between two images is found by locating the minimum of the summation.

Other image registration methods, such as Symmetric Phase-only Matched Filter (SPOMF), can also be used for the registration. The details of the SPOMF method are described in U.S. application Ser. No. 09/221,729 entitled "Image Registration Using Fourier Phase Matching," filed Dec. 29, 1998 in the names of Fang Dong et al., assigned to the parent of the present assignee and incorporated by reference into this application.

Each registered image is stored in memory 24. Upon registration of a predetermined number of image frames, the image frames in that multiplicity are retrieved from memory 24 and compounded by CPU 22 by selecting the maximum (i.e., peak) value of the pixel values corresponding to a particular pixel position in the respective registered image frames, by calculating the mean (i.e., average) of the pixel values corresponding to a particular pixel position in the respective registered image frames, by calculating the median pixel values corresponding to a particular pixel position in the respective registered image frames, or by calculating the peak_mean values corresponding to a region of pixels. For peak-detected compounding, the pixel values in the compounding image are either the maximum (max-detected) or minimum (min-detected) values of the corresponding pixels of the two frames. Similarly, the mean-detected (median-detected) method is to take the mean (median) pixel values of the two frames.

Figure 4:
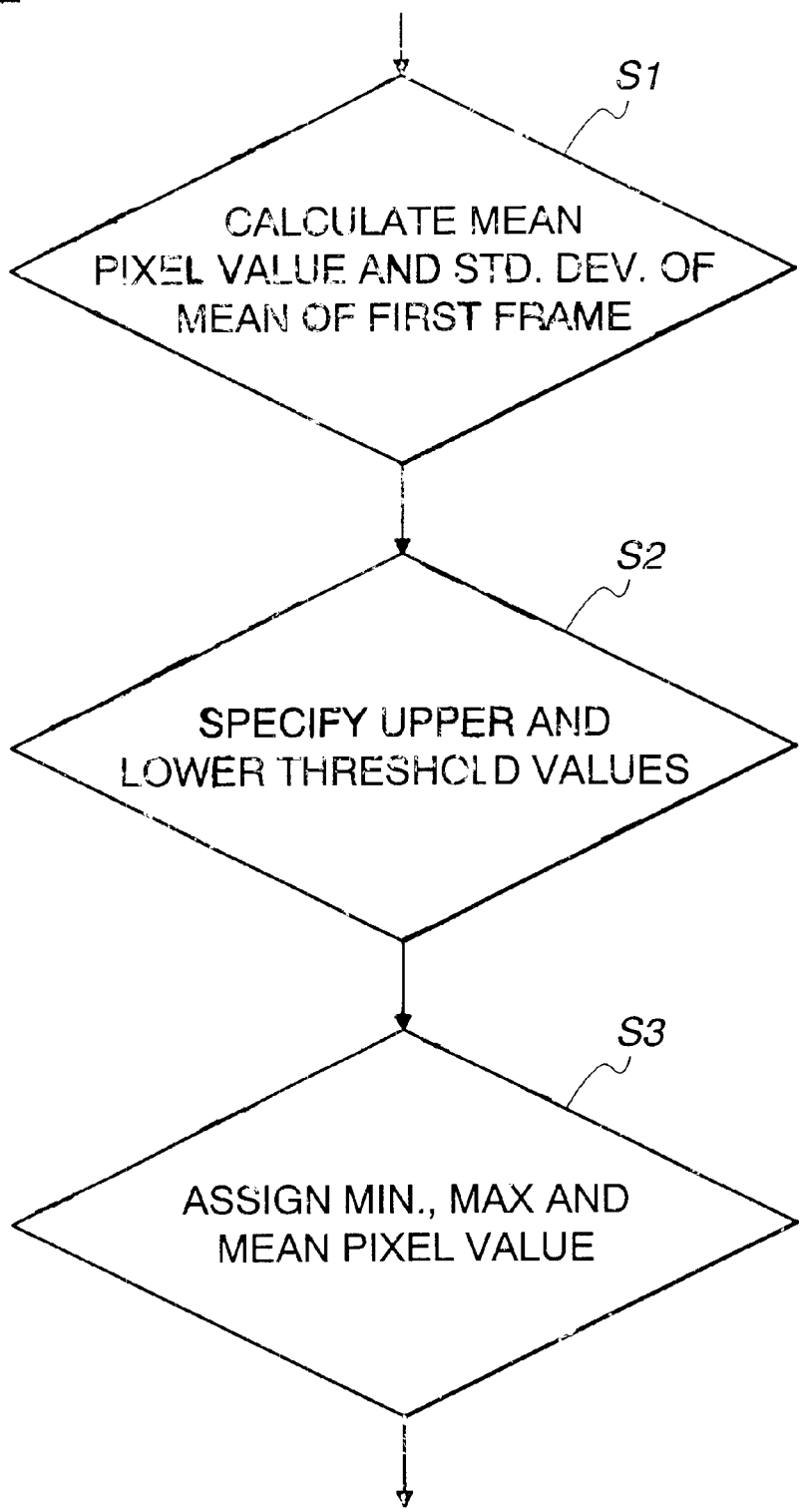
FIG. 4 is a flow diagram showing the steps of an image registration algorithm in accordance with the preferred embodiments of the invention.

One can also combine the peak-detected and mean-detected methods to form a "peak_mean" algorithm. Referring to FIG. 4, the peak_mean algorithm works as follows:

In Step S1, the mean pixel value and standard deviation of the mean of the first frame are calculated.

In Step S2, the upper and lower threshold values of the first frame acquired in position P1 are specified. The upper threshold value $T_U$ can be calculated by incrementing the mean pixel value by one standard deviation or half the standard deviation depending on the shape of the histogram of the first frame. Similarly, the lower threshold value $T_L$ can be calculated by decreasing the mean pixel value by one standard deviation or half the standard deviation.

In Step S3, the center pixel in the 5×5 neighbor regions of the first frame having a mean pixel value (over this 5×5 neighbor region) smaller than the lower threshold $T_L$ is assigned a minimum pixel value (min-detected). Similarly, the center pixel (in the 5×5 neighbor region) having a mean pixel value greater than the upper threshold $T_U$ is max-detected. The center pixel (of the 5×5 neighbor region) with a mean pixel value between the upper and lower thresholds is filled by a corresponding mean pixel value. The same steps are repeated for a second frame of data acquired in position P2. Steps S1–S3 result in a third frame of data which represents a registered image based on the first and second frames. The third frame of data is displayed on display 18.

The "peak_mean" method has advantages. For image sub-regions which lack anatomical structures, their pixel values are probably between the upper and lower thresholds, and these regions are suspected to be "speckle" regions. By applying the mean-detected method in these regions, the speckle noises can be reduced. On the other hand, for image sub-regions with anatomical structures, the pixel values on these regions are probably either lower or higher than the mean pixel value depending on the characteristics of the structures. By using a peak-detected (either minimum or maximum-detected) method, anatomical boundaries (with higher echo levels) and lesions (with either lower or higher echo levels) can be enhanced in the compounding image.

Those skilled in the art will recognize that the preferred embodiments may be altered and modified without departing from the true spirit and scope of the invention as defined in the accompanying claims.

What is claimed is:

1. An ultrasound imaging system comprising:

a transducer assembly operable to transmit ultrasound waves toward a subject and to receive reflected ultrasound waves from the subject;

a processor responsive to the reflected ultrasound waves and operable to generate a first frame of data representing a first image while the transducer assembly is held in a first position and to generate a second frame of data representing a second image while the transducer assembly is held in a second position different from the first position;

a memory storing at least the first frame and second frame and further storing a peak_mean image registration algorithm, said processor executing said algorithm to register the first frame with the second frame to generate a third frame of data representing a registered image; and a display operable to display the third frame of data.

2. A system, as claimed in claim 1, wherein said transducer assembly comprises an assembly suitable for manual manipulation.

3. A system, as claimed in claim 1, wherein said registration algorithm comprises a Sum of Absolute Difference image registration algorithm.

4. A system, as claimed in claim 1, wherein said processor executes said algorithm to generate:

a mean pixel value and a standard deviation of said mean pixel value of said first frame;

upper and lower threshold values of said first frame; and minimum, maximum and mean pixel values assigned to a group of pixels having a predetermined configuration in said first frame.

5. A system, as claimed in claim 4, herein said predetermined configuration comprises a 5×5 group of pixels.

6. A system, as claimed in claim 1, wherein said algorithm comprises a peak-detected compounding algorithm.

7. A system, as claimed in claim 1, wherein said algorithm comprises a mean-detected compounding algorithm.

8. A method of spatial compounding of ultrasound image frames from different view angles comprising:

transmitting first ultrasound waves toward a subject from a first angle;

receiving first reflected ultrasound waves from the subject in response to the first transmitted ultrasound waves;

transmitting second ultrasound waves toward a subject from a second angle;

receiving second reflected ultrasound waves from the subject in response to the second transmitted ultrasound waves;

generating a first frame of data representing a first image in response to the first reflected ultrasound waves;

generating a second frame of data representing a second image in response to the second reflected ultrasound waves;

storing at least the first frame and second frame and further storing a peak_mean image registration algorithm;

executing said algorithm to register the first frame with the second frame to generate a third frame of data representing a registered image; and displaying the third frame of data.

9. A method, as claimed in claim 8, wherein said first angle and said second angle are determined manually.

10. A method, as claimed in claim 8, wherein said registration algorithm comprises a Sum of Absolute Difference image registration algorithm.

11. A method, as claimed in claim 8, wherein said executing said algorithm comprises:

calculating a mean pixel value and a standard deviation of said mean pixel value of said first frame;

specifying upper and lower threshold values of said first frame; and assigning minimum, maximum and mean pixel values to a group of pixels having a predetermined configuration in said first frame.

12. A method, as claimed in claim 11, wherein said predetermined configuration comprises a 5×5 group of pixels.

13. A method, as claimed in claim 8, wherein said algorithm comprises a peak-detected compounding algorithm.

14. A system, as claimed in claim 8, wherein said algorithm comprises a mean-detected compounding algorithm.

* * * * *